United States Patent [19]

Kanda

[11] Patent Number: 5,088,704
[45] Date of Patent: Feb. 18, 1992

[54] FLUID-FILLED UPPER SUPPORT FOR SHOCK ABSORBER HAVING A PAIR OF TRUNCATED CONICAL ELASTIC MEMBERS

[75] Inventor: Ryouji Kanda, Komaki, Japan

[73] Assignee: Tokai Rubber Industries, Ltd., Aichi, Japan

[21] Appl. No.: 568,226

[22] Filed: Aug. 16, 1990

[30] Foreign Application Priority Data

Aug. 24, 1989 [JP] Japan ................. 1-99012[U]

[51] Int. Cl.$^5$ .................. B60G 13/08; F16F 5/00
[52] U.S. Cl. .................. 267/220; 267/140.1 A
[58] Field of Search ........... 248/562, 636; 267/219, 267/220, 140.1, 140.3, 140.4, 141, 141.1, 141.2, 141.3, 141.4, 141.5, 141.6, 141.7, 281, 293; 280/668, 673, 710, 716

[56] References Cited

U.S. PATENT DOCUMENTS

| | | | |
|---|---|---|---|
| 4,693,456 | 9/1987 | Kanda | 188/320 X |
| 4,741,519 | 5/1988 | Dubos et al. | 267/219 X |
| 4,756,514 | 7/1988 | Kanda | 267/140.1 |
| 4,786,036 | 11/1988 | Kanda | 267/140.1 |
| 4,790,520 | 12/1988 | Tanaka et al. | 267/219 X |
| 4,865,299 | 9/1989 | Goto | 267/219 X |
| 4,871,152 | 10/1989 | Funahashi | 248/562 X |
| 4,883,260 | 11/1989 | Kanda | 267/140.1 |

FOREIGN PATENT DOCUMENTS

| | | | |
|---|---|---|---|
| 0044908 | 2/1982 | European Pat. Off. | |
| 223712 | 5/1987 | European Pat. Off. | 267/219 |
| 0248714 | 12/1987 | European Pat. Off. | |
| 255434 | 2/1988 | European Pat. Off. | 267/219 |
| 3839699 | 7/1989 | Fed. Rep. of Germany . | |
| 55-24519 | 9/1980 | Japan . | |
| 55-24520 | 9/1980 | Japan . | |
| 189339 | 8/1986 | Japan | 267/140.1 |
| 62-224744 | 10/1987 | Japan . | |
| 130944 | 6/1988 | Japan | 267/140.1 |
| 130945 | 6/1988 | Japan | 267/140.1 |
| 74335 | 5/1989 | Japan | 267/140.1 |
| 229130 | 9/1989 | Japan | 267/140.1 |
| 38729 | 2/1990 | Japan | 267/140.1 |

*Primary Examiner*—Robert J. Oberleitner
*Assistant Examiner*—Alfred Muratori
*Attorney, Agent, or Firm*—Oliff & Berridge

[57] ABSTRACT

An upper support for a suspension system, which includes an inner rigid member having an annular wing portion, and axially opposite coned faces tapered from the wing portion to the axially opposite ends, a pair of annular rigid members disposed radially and axially outwardly of the inner rigid member, so as to face the coned faces of the inner rigid member, a pair of annular sealing rubber members fixed to the annular rigid members, and a pair of connecting rubber blocks for elastically connecting the inner rigid member and the annular rigid members. The rubber blocks partially define therebetween an annular pocket which is closed by an outer rigid member fitted on the annular rigid members via the sealing rubber members. The closed pocket is substantially divided by the wing portion into a pair of fluid chambers which are filled with a non-compressible fluid and which communicate with each other through an annular resonance portion defined between the wing portion and the outer rigid member.

8 Claims, 3 Drawing Sheets

FLUID-FILLED UPPER SUPPORT FOR SHOCK ABSORBER HAVING A PAIR OF TRUNCATED CONICAL ELASTIC MEMBERS

BACKGROUND OF THE INVENTION

1. Field of the Invention

The present invention relates in general to an upper support used in a suspension system of a motor vehicle, for elastically connecting a body of the vehicle and a shock absorber of the vehicle, and more particularly to such an upper support which has improved vibration-isolating capability while assuring high running and steering stability of the vehicle.

2. Discussion of the Prior Art

In a conventional suspension system of a motor vehicle, a generally cylindrical upper support is usually interposed between a body of the vehicle and a piston rod of a shock absorber which is linked with an axle or arm for supporting vehicle wheels. The upper support is adapted to prevent input vibrations received from the wheels through the shock absorber from being transmitted to the vehicle body, for example. Examples of such an upper support are disclosed in laid-open Publication Nos. 55-24519 and 55-24520 of unexamined Japanese Utility Model Applications. The upper support as disclosed in these publications generally consists of a cylindrical inner rigid member to which the piston rod of the shock absorber is fixed, a cylindrical outer rigid member which is disposed radially outwardly of the inner rigid member and fixed to the vehicle body, and an elastic body interposed between the inner and outer rigid members for elastically connecting the two rigid members.

The upper support as described above is required to be given a soft spring characteristic for improved vibration-isolating capability, for the purpose of preventing transmission of the vibrations from the shock absorber toward the vehicle body. At the same time, the upper support is required to exhibit a high degree of stiffness so as to minimize the amount of deformation thereof due to a change in the static load upon turning, braking or rapid acceleration or deceleration of the vehicle, for the purposes of avoiding excessive changes in the attitude of the vehicle, and thus assuring high running and steering stability of the vehicle.

To meet the above requirements of the upper support, the dynamic spring characteristic is adjusted to enhance the vibration-isolating capability, while the static spring characteristic is adjusted to enhance the running stability of the vehicle.

However, it is extremely difficult for the known upper support to fully satisfy these requirements for the vibration-isolating capability and the vehicle running stability, since the known upper support relies only upon elastic deformation of the elastic body for isolating the input vibrations. Namely, since there is a certain correlation between the dynamic and static spring characteristics of the elastic body, it is impossible for the upper support to provide a soft dynamic spring characteristic without exhibiting a soft static spring characteristic. Further, since the upper support used for the suspension system, in particular, is likely to receive a relatively large static load during use, the elastic body must be made of a rubber material having a relatively high static spring constant, which inevitably causes stiffening of the dynamic spring characteristic of the upper support. Although the upper support is required to isolate relatively high-frequency vibrations, such as road-oriented noises, which have frequencies of several tens to hundreds of hertz, the dynamic spring constant of the elastic body of the upper support tends to unfavorably increase with an increase in the frequency of the input dynamic vibrations. Thus, the known upper support suffers from an extremely high dynamic spring constant when it is subjected to the middle- to high-frequency vibrations as described above.

In the suspension system using the upper support as described above, it is also noted that the shock absorber may be oscillated due to lateral movements of the suspension arm or other components connected thereto. The oscillation of the shock absorber causes the inner rigid member to be pivotally displaced relative to the outer rigid member in a plane including the axes of the inner and outer rigid members, such that the upper and lower ends of the inner rigid member are moved in the radially opposite directions. The conventional upper support is not adapted to provide a spring characteristic suitable for dealing with the pivotal displacement of the inner rigid member relative to the outer rigid member as described above, but is likely to exhibit a relatively high dynamic spring constant or stiffness with respect to the shakes of the shock absorber applied to the upper support, resulting in lowered smoothness of movements of the suspension arm, and deterioration in the driving comfort of the vehicle.

SUMMARY OF THE INVENTION

The present invention was developed in the light of the prior art situations as described above. It is therefore an object of the invention to provide an upper support for a suspension system of a motor vehicle, which is capable of exhibiting excellent vibration-isolating capability while assuring high running stability of the vehicle.

The above object may be attained according to the principle of the present invention, which provides an upper support for a suspension system, which is interposed between a body of a vehicle and a shock absorber of the vehicle, for elastically connecting the vehicle body and the shock absorber, comprising (a) a generally cylindrical inner rigid member to which the shock absorber is fixed, the inner rigid member including an annular wing portion which protrudes radially outwards from an axially intermediate portion thereof, the inner rigid member having an outer circumferential surface which includes a pair of coned faces that are tapered from the annular wing portion to axially opposite ends of the inner rigid member, respectively, such that one of opposite ends of each of the coned faces which is adjacent to the wing portion has a larger diameter than the other end; (b) a pair of annular rigid members which are disposed radially and axially outwardly of the inner rigid member with a predetermined radial spacing therebetween, such that inner surfaces of the annular rigid members are opposed to the coned faces of the inner rigid member, respectively; (c) a pair of annular sealing rubber members fixed to respective outer circumferential surfaces of the pair of annular rigid members; (d) a pair of connecting rubber members each having a generally truncated conical shape, which are respectively interposed between the coned faces the inner rigid member and the inner surfaces of the annular rigid members, for elastically connecting the inner rigid member and the annular rigid members, the connecting rubber members at least partially defining a generally annular pocket between axially facing surfaces thereof, the pocket being open radially outwards through an axial spacing between the annular rigid members, the wing portion of the inner rigid member protruding into the pocket; and (e) an outer rigid member which is disposed radially outwardly of the inner rigid member and fixed to the body of the vehicle, the outer rigid member being fitted on the pair of annular sealing rubber members on the respective outer circumferential surfaces of the annular rigid members, so that an opening of the pocket is fluid-tightly closed by the outer rigid member with the pocket being filled with a noncompressible fluid, whereby the pocket is substantially divided into a pair of fluid chambers located on axially opposite sides of the wing portion of the inner rigid member, the wing portion having an outer circumferential surface which cooperates with an inner circumferential surface of the outer rigid member to define an annular resonance portion through which the pair of fluid chambers are held in fluid communication with each other.

When a load is applied to the present upper support in the axial direction, the truncated conical connecting rubber members interposed between the inner rigid member and the annular rigid members undergoes elastic deformation primarily in the form of compressive and tensile strains. Accordingly, the upper support exhibits comparatively high static spring constant or stiffness with respect to the axially applied load, assuring high running and steering stability of the vehicle. Further, the present upper support exhibits a soft spring characteristics or low static spring constant, with respect to vibrations which cause the inner rigid member to be pivotally displaced relative to the outer rigid member in the plane which includes the axes of the inner and outer rigid members. That is, the connecting rubber members undergo elastic deformation primarily in the form of a shear strain when the shock absorber is oscillated so as to pivotally displace the inner rigid member relative to the outer rigid member in the above-indicated plane. Accordingly, the connecting rubber members provide a relatively low degree of stiffness with respect to the input vibrational load that results in the pivotal displacement of the inner rigid member relative to the outer rigid member. This characteristic of the present upper support assures considerably smooth movements of the suspension system. Further, the resonance of the fluid flowing through the resonance portion between the two fluid chambers provides a sufficiently low dynamic spring constant with respect to a dynamic vibrational load (medium- to high-frequency vibrations) applied in the axial direction. Hence, the present upper support assures a significantly improved driving comfort of the vehicle without deteriorating the running and steering stability of the vehicle.

The outer rigid member may consist of an intermediate sleeve fixed to the pair of annular sealing rubber members for fluid-tightly closing the opening of the pocket, and an outermost assembly consisting of an upper and a lower cylindrical member and fitted on the intermediate sleeve. The upper and lower cylindrical members have respective outward flanges for attaching the upper support to the body of the vehicle, and respective inward flanges between which the annular rigid members are gripped in the axial direction of the upper support.

Each of the annular rigid members may consist of a cylindrical portion, and an inward flange portion which extends radially inwards from an axially outer end of the cylindrical portion.

The pair of sealing rubber members and the pair of connecting rubber members may be formed integrally with each other to constitute an elastic body which is interposed between the inner and outer rigid members. This elastic body may further include a buffer rubber layer for covering the outer circumferential surface of the wing portion of the inner rigid member.

The inner rigid member may further include an inward flange which extends radially inwards from the axially intermediate portion thereof, for fixing the upper support to the shock absorber.

Each connecting rubber members may be formed such that the wall of the truncated cone is inclined about 45° with respect to the axes of the inner and outer rigid members. However, the principle of the present invention may be practiced, provided that the inclination angle of the truncated conical walls of the connecting rubber members is relatively near 45°, and the angle of the coned faces of the inner rigid member is suitably selected, so that the connecting rubber members are subject to compressive and tentile strains upon application of an axial load, and a shear strain upon application of a radial load that causes the inner rigid member to be pivotally displaced with its upper and lower ends displaced in the opposite radial directions in a plane which includes the axis of the upper support.

BRIEF DESCRIPTION OF THE DRAWINGS

The above and optional objects, features and advantages of the present invention will be better understood by reading the following description of a presently preferred embodiment of the invention, when considered in conjunction with the accompanying drawings, in which.

DETAILED DESCRIPTION OF THE PREFERRED EMBODIMENT

Figure 1:
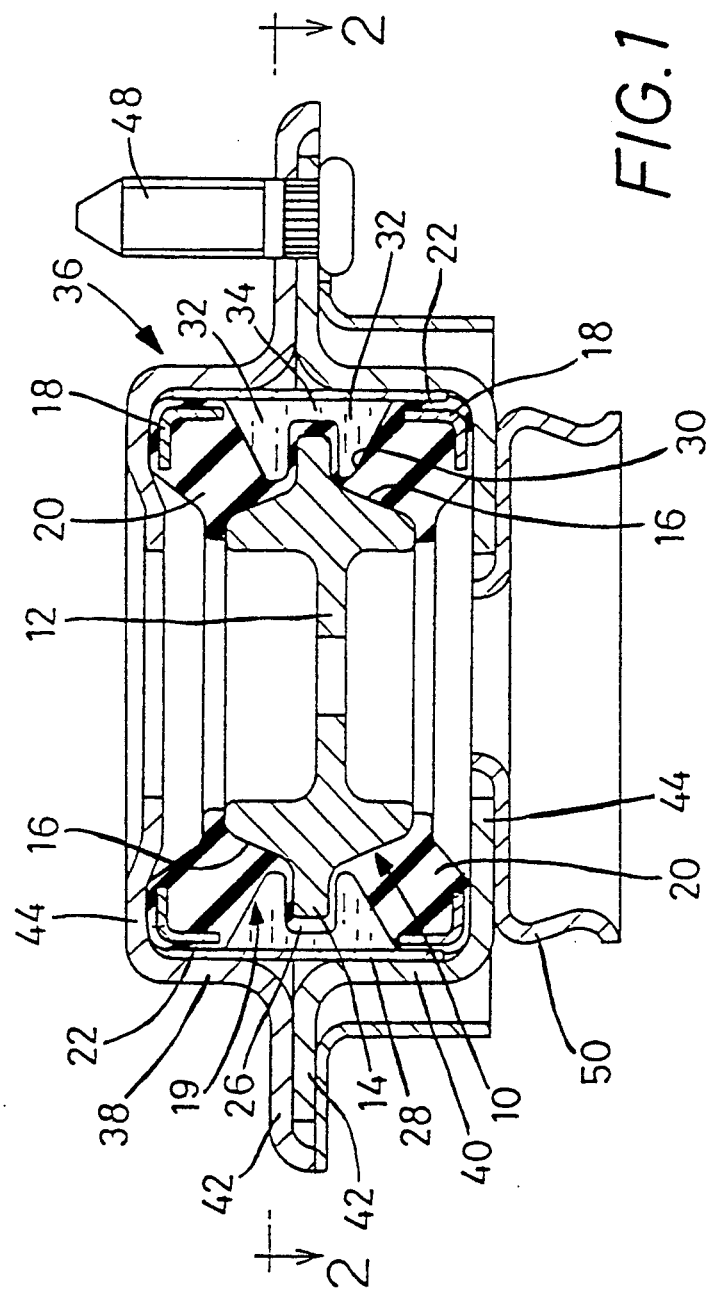
FIG. 1 is an elevational view in axial cross section of one embodiment of the present invention in the form of a cylindrical upper support for a suspension system of a motor vehicle.
Figure 2:
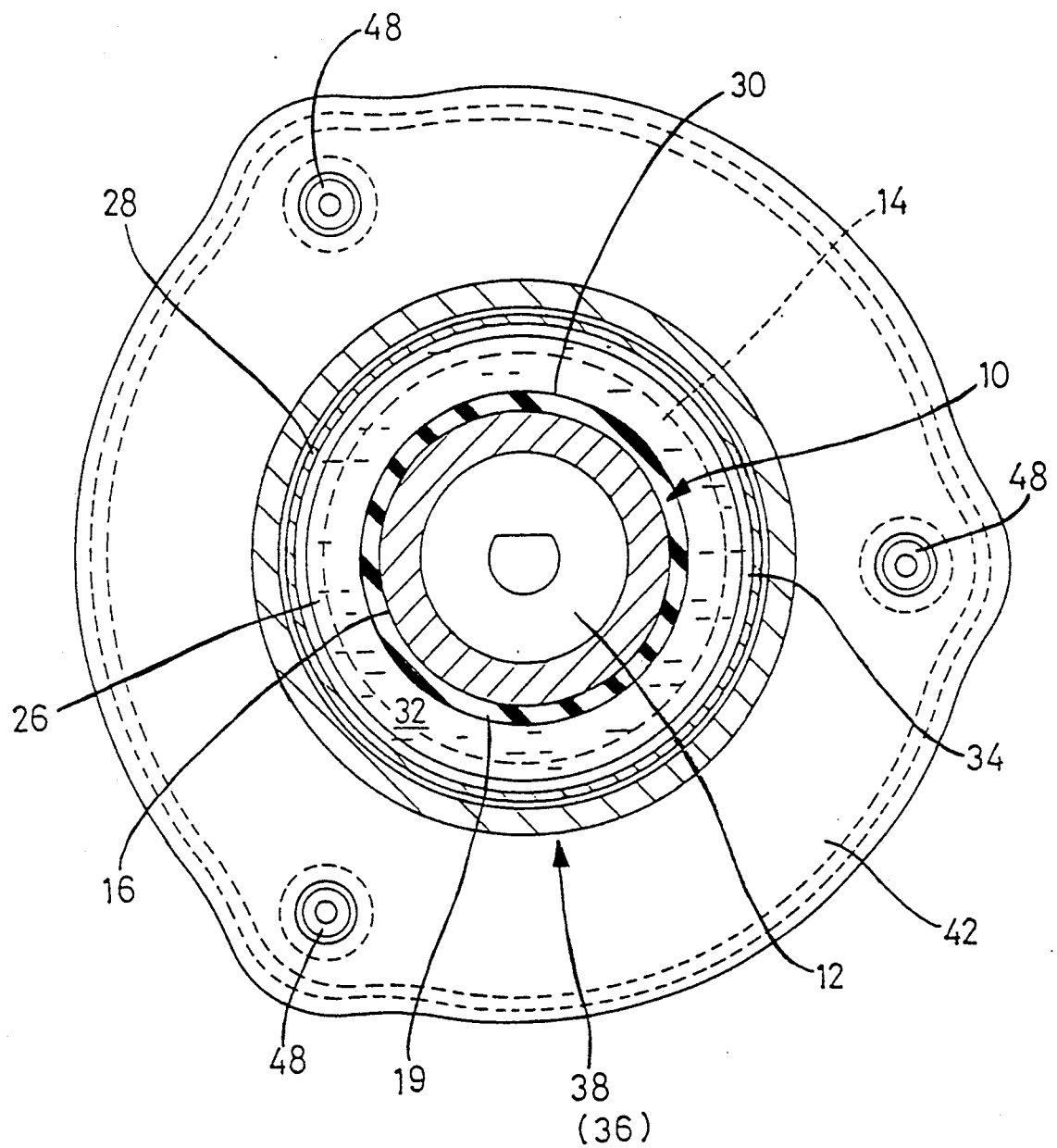
FIG. 2 is a transverse cross sectional view taken along line 2—2 of FIG. 1.

Referring first to FIGS. 1 and 2, there is illustrated a generally cylindrical upper support used in a rear suspension system of a motor vehicle. In these figures, reference numeral 10 denotes a generally cylindrical inner rigid member in the form of an inner metal member. The inner metal member 10 has an integrally formed mounting portion 12 in the form of an inward flange, which extends radially inwards from an axially intermediate portion of an inner circumferential surface of the member 10. The inner metal member 10 is fixed at its mounting portion 12 to a piston rod of a shock absorber (not shown) of the suspension system.

The inner metal member 10 further has an integrally formed wing portion 14 in the form of an annular plate, which extends radially outwards by a predetermined distance from an axially intermediate portion of an outer circumferential surface of the member 10. The outer circumferential surface of the inner metal member 10 has axially opposite portions located on the opposite sides of the wing portion 14, which portions provide a pair of coned faces 16, 16 that are tapered from the wing portion 14 to the respective axially opposite ends of the inner metal member 10, such that one of opposite ends of each coned face 16 which is adjacent to the wing portion 14 has a larger diameter than the other end.

Radially outwardly of the inner metal member 10, there are disposed a pair of annular rigid members in the form of metal members 18, 18 in coaxial relationship with the member 10, with a suitable radial spacing therebetween. Each of the annular metal members 18, 18 is positioned axially outwardly of the corresponding axial end of the inner metal member 10, such that the annular metal member 18 is opposed to the corresponding coned face 16 of the inner metal member 10, in a direction of a straight line which passes the member 18 and the center of the mounting portion 12 of the inner metal member 10, as seen the cross sectional view of FIG. 1. More specifically, each annular metal member 18 has an L-shaped cross section, that is, consists of a cylindrical portion, and an inward flange portion which extends radially inwards from an axially outer end of the cylindrical portion. These coaxial annular metal members 18, 18 are spaced from each other by a suitable distance in the axial direction of the upper support, as shown in FIG. 1.

Figure 3:
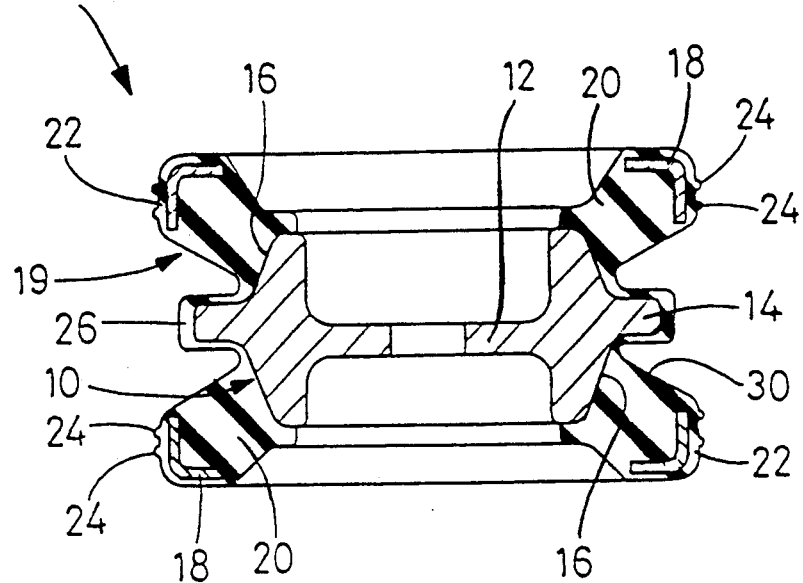
FIG. 3 is an axial cross sectional view showing an intermediate product obtained by vulcanization of a rubber material during manufacture of the upper support of FIG. 1.

Between the inner metal member 10 and the annular metal members 18, 18, there is interposed an elastic body 19 made of a rubber material, which includes a pair of connecting rubber blocks 20, 20 each having a generally truncated conical shape. These connecting rubber blocks 20 are respectively interposed between the coned faces 16 of the inner metal member 10, and the corresponding annular metal members 18 which are opposed to the coned faces 16, 16, so as to elastically connect the inner metal member 10 and the annular metal members 18. The two connecting rubber blocks 20 are disposed symmetrically with each other, with respect to a plane which includes the plane of the wing portion 14, such that the large end of the truncated cone of each connecting rubber block 20 is located at the corresponding axial end of the upper support. Each connecting rubber block 20 is secured at its inner circumferential surface to the corresponding cone face 16 of the inner metal member 10, and at its outer circumferential surface to an inner surface of the corresponding annular metal member 18, by means of vulcanization of a rubber material, whereby an inner assembly (10, 18, 19) of the upper support is obtained as an intermediate product 21 as shown in FIG. 3.

In the present embodiment, the wall of the truncated cone of each connecting rubber block is inclined about 45° with respect to the above-indicated plane, as seen in the cross sectional plane of FIG. 1, i.e., with respect to the axis of the inner metal member 10.

The thus constructed inner assembly 21 has an annular pocket or recessed portion 30 defined between axially facing surfaces of the connecting rubber blocks 20, 20. The pocket 30 extends over the entire circumference of the inner assembly 21, and is open in the radial direction, through the axial spacing between the two annular metal members 18, 18. The above-described wing portion 14 of the inner metal member 10 protrudes radially outwards into an axially intermediate portion of the annular pocket 30.

The elastic body 19 having the truncated conical connecting rubber blocks 20 also includes a pair of thin-walled sealing rubber layers 22, 22, which are formed as integral parts of the rubber blocks 20, so as to cover respective outer surfaces of the annular metal members 18. Each sealing rubber layer 22 has two sealing lips 24, 24 formed on its outer circumferential surface. These sealing lips 24 are formed over the entire circumference of the sealing rubber layer 22, and have a suitable height and a suitable axial spacing therebetween.

The elastic body 19 further includes an integrally formed buffer rubber layer 26 having a predetermined thickness, which is formed to cover the wing portion 14 of the inner metal member 10. Namely, each truncated conical connecting rubber block 20 has an extension extending from the axially inner small-diameter end so as to provide the buffer rubber layer 26 covering the wing portion 14.

Figure 4:
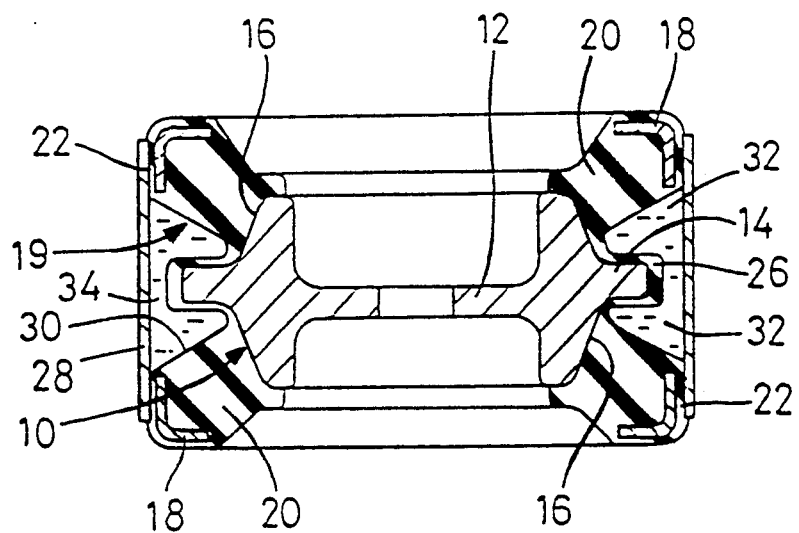
FIG. 4 is an axial cross sectional view showing the intermediate product of FIG. 3 on which an intermediate sleeve is mounted during manufacture of the upper support of FIG. 1.

The upper support has a relatively thin-walled, cylindrical intermediate sleeve 28 made of metal, which is press-fitted on the outer circumferential surface of the inner assembly 21, as shown in FIG. 4. More specifically, this intermediate sleeve 28 is radially inwardly compressed by using eight dies, for example, so that the sleeve 28 is secured to the outer circumferential surface of the inner assembly 21. With the intermediate sleeve 28 mounted on the inner assembly 21, the opening of the pocket 30 defined by the rubber blocks 20 and wing portion 14 (rubber layer 26) is closed by the sleeve 28, to thereby provide a fluid-tightly enclosed space. That is, the enclosed space is defined by the elastic body 19, wing portion 14 of the inner metal member 10, and the intermediate sleeve 28. When the intermediate sleeve 28 is press-fitted on the inner assembly 21, the sealing rubber layers 22 are sandwiched and pressed by and between the annular metal members 18 and the intermediate sleeve 28, thereby assuring fluid tightness of the enclosed pocket 30.

The fluid-tightly enclosed space provided by the pocket 30 closed by the intermediate sleeve 28 is substantially divided into two sections, by the wing portion 14 located at the axially intermediate portion of the pocket 30. Thus, there are formed a pair of annular fluid chambers 32, 32 which are disposed on the axially opposite sides of the wing portion 14. At the same time, an annular restricted portion 34 is formed between the outer circumferential surface of the wing portion 14 (buffer rubber layer 26) and the inner circumferential surface of the intermediate sleeve 28, i.e., between radially facing surfaces of the wing portion 14 and intermediate sleeve 28, such that the two fluid chambers 32, 32 communicate with each other through the restricted portion 34.

The annular fluid chambers 32, 32 and the restricted portion 34 are filled with a suitable non-compressible fluid. It is desirable that the non-compressible fluid has a relatively low kinematic viscosity, more specifically, not higher than 100 centistokes, for a sufficient degree of fluidity of the fluid, to thereby ensure an intended vibration isolating effect based on flows of the fluid between the two chambers 32. For example, the non-compressible fluid is suitably selected from the group which includes water, alkylene glycol, polyalkylene glycol, and silicone oil. The filling of the fluid chambers 32, 32 and the restricted portion 34 with the fluid as described above may be accomplished by mounting the intermediate sleeve 28 on the inner assembly 21, within a mass of the selected fluid contained in a suitable vessel.

As shown in FIGS. 1 and 2, an outer metal assembly 36 is fitted on and firmly attached to the intermediate sleeve 28 of the inner assembly 21. The outer metal assembly 36 consists of an upper cylindrical member 38 and a lower cylindrical member 40 both made of metal. Each of the upper and lower cylindrical members 38, 40 has an outward flange 42 formed at an axially inner open end thereof, and an inward flange 44 formed at an axially outer open end thereof. The upper and lower cylindrical members 38, 40 are fitted onto the intermediate sleeve 28 such that the open ends having the outward flanges 42 are superposed on each other. In this manner, the upper and lower cylindrical members 38, 40 are assembled together into the outer metal assembly 36, with the superposed outward flanges 42 extending radially from an axially intermediate portion of the assembly 36. In FIG. 1, reference numeral 50 denotes a retaining metal member secured to the lower cylindrical member 40, for attaching a bound stopper to the upper support.

The outer metal assembly 36 is attached to the intermediate sleeve 28 such that the annular metal members 8 of the inner assembly 21 are axially gripped by and between the inward flanges 44 of the upper and lower cylindrical members 38, 40. Three mounting bolts 48 are fixed to the superposed outward flanges 42 of the upper and lower cylindrical members 38, 40, so that the outer metal assembly 36 is fixedly attached to the vehicle body (not shown) by means of these bolts 48.

It will be understood from the above description of the instant embodiment that the intermediate sleeve 28 and the outer metal assembly 36 secured to the outer circumferential surface of the sleeve 28 cooperate to constitute an outer rigid member of the upper support.

In the instant upper support constructed as described above, a vibrational load received from the shock absorber is primarily received by the connecting rubber blocks 20, 20 of the elastic body 19. In this connection, it is noted that each truncated conical connecting rubber block 20 is interposed between the corresponding coned face 16 of the inner metal member 10, and the inner surface of the annular metal member 18, which is opposed to the coned face 16 in the direction of the straight line which passes the member 18 and the center of the mounting portion 12 of the inner metal member 10 (inner rigid member). Further, the wall of the truncated cone of the rubber block 20 is inclined about 45° with respect to the axis of the upper support. Accordingly, upon application of an axial load between the inner and outer rigid members (10; 28, 36), the connecting rubber blocks 20 undergo elastic deformation primarily in the form of compressive and tensile strains. When a vibrational load is applied between the inner and outer rigid members (10; 28, 36) such that the inner metal member 10 is pivotally displaced relative to the outer rigid member (28, 36) in a plane which includes the axes of the rigid members, the connecting rubber blocks 22 undergo elastic deformation primarily in the form of shear strain.

Consequently, the instant upper support exhibits a comparatively hard spring characteristic with respect to the input load applied in the axial direction thereof, assuring high running and steering stability of the vehicle. Further, the instant upper support exhibits a comparatively soft spring characteristic with respect to a vibrational load causing the relative pivotal displacement between the inner and outer rigid members in the above-identified plane, thereby permitting smooth operation of the suspension system (easy movements of the shock absorber), which leads to a significantly improved driving comfort of the vehicle.

When the instant upper support receives axial vibrations applied between the inner and outer rigid members (10; 28, 36) in the axial direction thereof, the wing portion 14 of the inner metal member 10 is axially oscillated within the pocket 30 relative to the intermediate sleeve 28 and outer metal assembly 36, due to elastic deformation of the connecting rubber blocks 20. As a result, relative volumetric changes occur between the two fluid chambers 32, 32, and the fluid is forced to flow alternately in the opposite axial directions between the two fluid chambers 32, 32, through the restricted portion 34.

Consequently, the upper support can provide a sufficiently lowered dynamic spring constant, based on resonance of the fluid flowing through the restricted portion 34. It is possible to suitably determine the frequency range of the vibrations for which the upper support provides a low dynamic spring constant based on the resonance of the fluid. That is, the frequency range may be determined by adjusting the resonance frequency of the fluid flowing through the restricted portion 34, more specifically, by adjusting the axial length and cross sectional area of the restricted portion 34. According to an experiment, the instant upper support is capable of isolating vibrations over a relatively wide frequency range, i.e., in a middle- to high-frequency range of about several tens to hundreds of hertz. It will be understood that the restricted portion 34 serves as a resonance portion through which the fluid is forced to flow so as to isolate the input vibrations based on the resonance of the fluid, when a volumetric change occurs in the two fluid chambers 32 upon application of a dynamic vibrational load in the axial direction of the upper support.

It is also noted that the reduction in the dynamic spring constant based on the fluid flows as described above is provided only with respect to the dynamic vibrations in the middle- to high-frequency range. This vibration isolating effect of the upper support does not significantly disturb the hard spring characteristic of the connecting rubber blocks 20 with respect to the static load applied in the axial direction thereof, whereby the rubber blocks 20 are able to exhibit a sufficient degree of static spring stiffness.

Thus, the instant upper support is capable of effectively reducing transmission of vibrations and noises, such as road-oriented noises, during running of the vehicle, while assuring high running and steering stability of the vehicle, namely, a significantly improved driving comfort of the vehicle.

While the present invention has been described in its presently preferred embodiment, for illustrative purpose only, it is to be understood that the invention is not limited to the details of the illustrated embodiment, and the invention may be otherwise embodied.

While the outer rigid member consists of the intermediate sleeve 28 and the outer metal assembly 36 in the illustrated embodiment, the outer rigid member may be a single, generally cylindrical metal member having a mounting portion at which the upper support is attached to the vehicle body.

In the illustrated embodiment, the connecting rubber blocks 20, 20 and the sealing rubber layers 22, 22 are formed integrally with each other to constitute the elastic body 19. However, the rubber blocks 20 and the rubber layers 22 may be separately formed members.

It is to be understood that the present invention may be embodied with various other changes, modifications and improvements, which may occur to those skilled in the art, without departing from the spirit and scope of the invention defined in the following claims.

What is claimed is:

1. An upper support for a suspension system, which is interposed between a body of a vehicle and a shock absorber of the vehicle, for elastically connecting the vehicle body and the shock absorber, comprising:

a generally cylindrical inner rigid member to which said shock absorber is fixed, said inner rigid member including an annular wing portion which protrudes radially outward from an axially intermediate portion, said inner rigid member having an outer circumferential surface which includes a pair of coned faces that are tapered from said annular wing portion to axially opposite ends of the inner rigid member, respectively, such that one of opposite ends of each of said coned faces which is adjacent to said wing portion has a larger diameter than the other end;

a pair of annular rigid members which are disposed radially and axially outwardly of said inner rigid member with a predetermined radial spacing therebetween, such that inner surfaces of said annular rigid members are opposed to said pair of coned faces of said inner rigid member, respectively, each of said annular rigid members having a cylindrical portion, and an inward flange portion which extends radially inwards from an axially outer end of the cylindrical portion;

a pair of annular sealing rubber members fixed to respective outer circumferential surfaces of said cylindrical portions of said pair of annular rigid members;

a pair of connecting rubbers members each having a generally truncated conical shape, which are respectively interposed between and secured to said coned faces of said inner rigid member and said inner surfaces of the annular rigid members, for elastically connecting said inner rigid member and said pair of annular rigid members, said connecting rubber members at least partially defining a generally annular pocket between axially facing surfaces thereof, said pocket being open radially outward through an axial spacing between said pair of annular rigid members, said wing portion of the inner rigid member protruding into said pocket; and an outer rigid member which is disposed radially outwardly of said inner rigid member and fixed to said body of the vehicle, said outer rigid member being fitted on said pair of annular sealing rubber members on the respective outer circumferential surfaces of said cylindrical portions of said annular rigid members, so that an opening of said pocket is fluid-tightly closed by said outer rigid member with the pocket being fitted with a non-compressible fluid, whereby said pocket is substantially divided into a pair of fluid chambers located on axially opposite sides of said wing portion of the inner rigid member, said wing portion having an outer circumferential surface which cooperates with an inner circumferential surface of said outer rigid member to define an annular resonance portion through which said pair of fluid chambers are held in fluid communication with each other, said outer rigid member having at axially opposite ends thereof axially opposite inward flange portions which are disposed axially outwardly of said inward flange portions of said annular rigid members, to apply axially gripping forces on said annular rigid members.

2. An upper support according to claim 1, wherein said outer rigid member includes an intermediate sleeve fixed to said pair of annular sealing rubber members for fluid-tightly closing the opening of said pocket, and an outermost assembly including an upper and a lower cylindrical member and fitted on said intermediate sleeve, said upper and lower cylindrical members having respective outward flanges for attaching the upper support to said body of the vehicle, and respective inward flanges comprising said axially opposite inward flange portions between which said pair of annular rigid members are gripped in the axial direction of the upper support.

3. An upper support according to claim 1, wherein said generally cylindrical inner rigid member is a one-piece member which has said annular wing portion as an integral part thereof.

4. An upper support according to claim 1, wherein said pair of annular sealing rubber members and said pair of connecting rubber members are formed integrally with each other to constitute an elastic body which is interposed between said inner and outer rigid members.

5. An upper support according to claim 4, wherein said elastic body further includes a buffer rubber layer for covering said outer circumferential surface of said wing portion of the inner rigid member.

6. An upper support according to claim 1, wherein said inner rigid member further includes an inward flange which extends radially inwards from the axially intermediate portion thereof, for fixing the upper support to said shock absorber.

7. An upper support according to claim 1, wherein said non-compressible fluid has a kinematic viscosity of not higher than 100 centistokes.

8. An upper support according to claim 1, wherein a wall of a truncated cone of each of said pair of connecting rubber members is inclined about 45° with respect to an axis of said inner rigid member.

* * * * *